(No Model.)

D. W. HOLDEN.
HOOK.

No. 518,452. Patented Apr. 17, 1894.

WITNESSES:
John A. Rennie
C. Sedgwick

INVENTOR
D. W. Holden
BY
Munn & Co.
ATTORNEYS.

UNITED STATES PATENT OFFICE.

DAVID WINFIELD HOLDEN, OF GARDINER, OREGON.

HOOK.

SPECIFICATION forming part of Letters Patent No. 518,452, dated April 17, 1894.

Application filed March 1, 1893. Serial No. 464,168. (No model.)

*To all whom it may concern:*

Be it known that I, DAVID WINFIELD HOLDEN, of Gardiner, in the county of Douglas and State of Oregon, have invented a new and Improved Hook, of which the following is a full, clear, and exact description.

The object of the invention is to provide a new and improved hook which is simple and durable in construction, very effective in operation, and more especially designed for chains used for logging and other purposes, and arranged to conveniently unhook the load, while under strain to obviate backing up to "cast off."

The invention consists of a shank provided with a locking link to engage the hook pivoted on the shank, the latter being provided on the inside at the pivot end with a projection to limit the inward swinging motion of the hook and to protect the pivot.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in both the figures.

Figure 1:
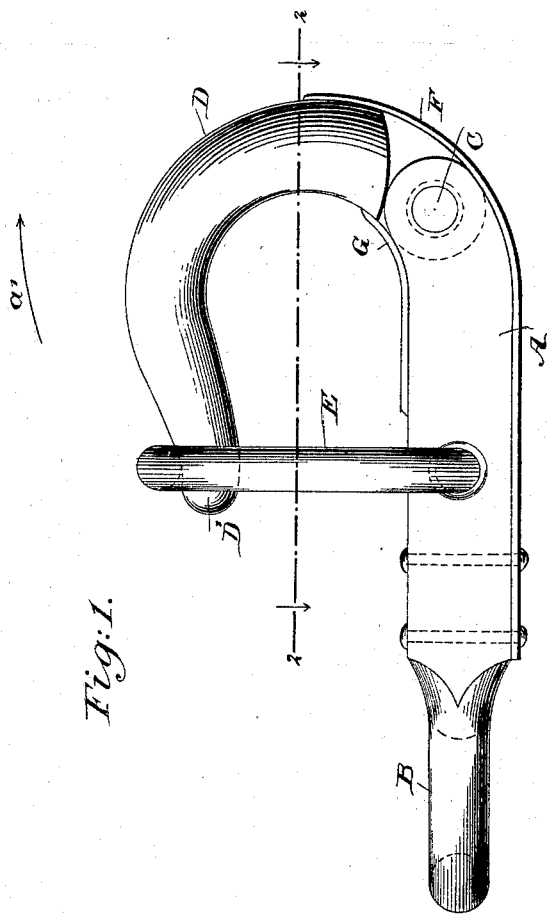
Figure 2:
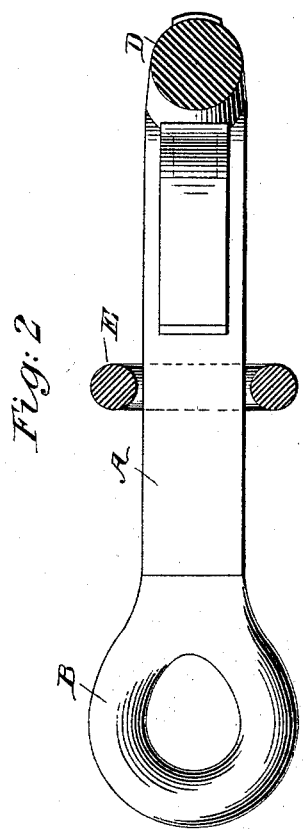

Figure 1 is a side elevation of the improvement; and Fig. 2 is a sectional plan view of the same on the line 2—2 of Fig. 1.

The improved hook is provided with a shank A formed at one end into an eye B for connection with the logging chain. On the other end of the shank A is arranged a transversely-extending pivot C on which is pivoted the hook D proper, adapted to be engaged at its point D′ by a link E hung on the shank A by passing through a transverse aperture therein.

On the hook D and at the pivot end thereof, presses the free end of a spring F riveted or otherwise secured to the back of the shank A. The free end of the spring F is curved to engage the curved back of the hook D′, so that the hook is held normally in the position shown in Fig. 1, but is free to swing open in the direction of the arrow a′, whenever it is desired to cast off the load.

On the inside of the shank A is welded or otherwise secured the projection, G, which is in the nature of a lip, or flange, extending over the joint of the hook and conforming to the curve of the latter, thereby protecting the joint, also forming a stop which prevents the hook from swinging too far inward.

The logging chain is engaged by the hook when the latter is in an open position and then the hook D is permitted to swing shut by the action of the spring F. The operator then swings the link E upward to engage the point D′ of the hook D proper, thus locking the hook in place and also the chain engaged by the hook.

In unlocking the hook, the operator swings the link E out of engagement with the point D′ of the hook D proper, so that the strain on the said hook by the logging chain, causes the hook to swing open against the tension of the spring F to cast off the chain, and as soon as the chain has left the hook, the latter returns to its normal position by the action of the spring F.

Having thus fully described my invention, I claim as new and desire to secure by Letters Patent—

1. A hook comprising a shank, a hook proper pivoted on one end of said shank, a locking link held on the said shank and adapted to engage the point of the said hook, and the curved lip, or flange, G, secured to the inner side of the said shank, and extending over the joint and lapping the body of the hook, whereby it covers and protects the joint and is adapted to engage the hook to limit its inward movement, as shown and described.

2. A hook comprising a shank, a hook proper pivoted on one end of the said shank, a locking link held on the said shank and adapted to engage the point of the said hook, a projection arranged on the inside of the said shank and adapted to be engaged by the said hook near its pivot end, and a spring secured on the back of the said shank and having its free end curved onto the back of the pivot end of the said hook, substantially as shown and described.

DAVID WINFIELD HOLDEN.

Witnesses:
M. FRENCH, Jr.,
O. B. HINSDALE.